(12) United States Patent
Li et al.

(10) Patent No.: US 10,212,642 B2
(45) Date of Patent: Feb. 19, 2019

(54) DEVICE-TO-DEVICE BASED USER EQUIPMENT TO NETWORK RELAY

(71) Applicant: Nokia Technologies Oy, Espoo (FI)

(72) Inventors: Zexian Li, Espoo (FI); Carl Wijting, Espoo (FI)

(73) Assignee: Nokia Technology Oy, Espoo (FI)

( * ) Notice: Subject to any disclaimer, the term of this patent is extended or adjusted under 35 U.S.C. 154(b) by 149 days.

(21) Appl. No.: 15/112,914

(22) PCT Filed: Feb. 27, 2014

(86) PCT No.: PCT/FI2014/050142
§ 371 (c)(1),
(2) Date: Jul. 20, 2016

(87) PCT Pub. No.: WO2015/128537
PCT Pub. Date: Sep. 3, 2015

(65) Prior Publication Data
US 2016/0337936 A1 Nov. 17, 2016

(51) Int. Cl.
*H04W 40/22* (2009.01)
*H04W 40/04* (2009.01)
(Continued)

(52) U.S. Cl.
CPC .......... *H04W 40/22* (2013.01); *H04B 7/2606* (2013.01); *H04L 5/0055* (2013.01);
(Continued)

(58) Field of Classification Search
CPC . H04W 72/042; H04W 48/08; H04W 76/023; H04W 88/06; H04W 88/10; H04W 72/048; H04W 92/18; H04W 40/22; H04W 76/025; H04W 8/005; H04W 16/14; H04W 4/025; H04W 40/246; H04W 84/10; H04W 88/04; H04W 40/00; H04W 28/06; H04W 4/023; H04W 84/18; H04W 4/06;
(Continued)

(56) References Cited

U.S. PATENT DOCUMENTS

2007/0081479 A1   4/2007   Kang et al.
2009/0073921 A1   3/2009   Ji et al.
(Continued)

FOREIGN PATENT DOCUMENTS

WO   2012096611   7/2012
WO   2013123674   8/2013
WO   2013131234   9/2013

OTHER PUBLICATIONS

International Search Report and Written Opinion received for corresponding Patent Cooperation Treaty Application No. PCT/FI2014/050142, dated Oct. 14, 2014, 13 pages.

*Primary Examiner* — Jung Liu
(74) *Attorney, Agent, or Firm* — Nokia Technologies Oy

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to perform at least the following: generate or receive a message comprising relay capability information, and transmit or forward the message to a device to device group.

18 Claims, 7 Drawing Sheets

(51) Int. Cl.
*H04L 5/00* (2006.01)
*H04W 8/00* (2009.01)
*H04W 8/08* (2009.01)
*H04W 40/24* (2009.01)
*H04B 7/26* (2006.01)
*H04W 76/14* (2018.01)
*H04W 88/04* (2009.01)

(52) U.S. Cl.
CPC ............ *H04W 8/005* (2013.01); *H04W 8/08* (2013.01); *H04W 40/04* (2013.01); *H04W 40/24* (2013.01); *H04W 76/14* (2018.02); *H04W 88/04* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/166* (2018.01); *Y02D 70/21* (2018.01); *Y02D 70/22* (2018.01); *Y02D 70/32* (2018.01); *Y02D 70/449* (2018.01)

(58) Field of Classification Search
CPC ...... H04W 4/02; H04W 4/028; Y02D 70/142; Y02D 70/00; Y02D 70/1242; Y02D 70/21; Y02D 70/1262; Y02D 70/22; Y02D 70/164; Y02D 70/1226; Y02D 70/39; Y02D 70/146; H04H 20/08; G01S 5/14; G01S 5/10; H04L 12/1868; H04L 12/1845; H04L 5/001; H04L 12/189
See application file for complete search history.

(56) References Cited

U.S. PATENT DOCUMENTS

| | | |
|---|---|---|
| 2011/0117907 A1 | 5/2011 | Hooki et al. |
| 2013/0188552 A1* | 7/2013 | Kazmi .................. H04L 5/001 370/315 |
| 2014/0162544 A1* | 6/2014 | Edge .................... H04W 8/005 455/3.01 |
| 2014/0171062 A1* | 6/2014 | Fallgren ............... H04W 40/22 455/422.1 |
| 2014/0304383 A1* | 10/2014 | Guo ....................... H04W 4/70 709/223 |
| 2015/0133112 A1* | 5/2015 | Wang .................. H04W 76/023 455/426.1 |
| 2015/0215903 A1* | 7/2015 | Zhao ..................... H04W 72/04 370/329 |
| 2016/0014668 A1* | 1/2016 | Chou .................... H04W 76/14 455/7 |
| 2016/0143077 A1* | 5/2016 | Fodor ................... H04W 76/14 370/329 |
| 2016/0345279 A1* | 11/2016 | Gunnarsson ...... H04W 56/0025 |
| 2017/0006563 A1* | 1/2017 | Lindoff ............... H04W 56/001 |

* cited by examiner

US 10,212,642 B2

DEVICE-TO-DEVICE BASED USER EQUIPMENT TO NETWORK RELAY

RELATED APPLICATION

This application was originally filed as PCT Application No. PCT/FI2014/050142 filed Feb. 27, 2014.

TECHNICAL FIELD

The present application relates to wireless communications and, in particular, device-to-device based user equipment to network relay.

BACKGROUND

There are various types of networks, including infrastructure networks (e.g., the internet, cellular networks, and/or the like), ad-hoc networks, or a combination of both. In the case of the infrastructure network, the user equipment communicates (e.g., transmits and/or receives information) with another user equipment through an access point, such as base station or a wireless access point. In the case of the ad-hoc network, the user equipment communicates directly with another user equipment. Ad hoc networks are also called "proximity services" (ProSe) and/or "device-to-device" (D2D) networks, referring to the wireless direct link(s) between a plurality of user equipment. In the case of ad-hoc, D2D communications, some of the D2D communications may also be controlled by a base station, providing so-called "cellular controlled" D2D communications (which is also referred to as cellular assisted D2D communications). In cellular controlled D2D communications, two devices may be directly linked via a D2D connection, and one or both of the devices may be attached to a base station, such as an enhanced Node B (eNB) base station, to exchange control information with the eNB (or other nodes of the network). Some examples of D2D communication include direct communications in a cluster of proximity devices, autonomous D2D communication in a cellular network, etc.

In a radio communication system, there may be a scenario in which one user equipment (UE) may rely on another node, for example, another user equipment, a bridge, a router, and/or the likes, to communicate with an access point. In such a scenario, the user equipment which relies on another node may be referred to as "a relayed UE", and the node on which another user equipment relies may be referred to as "a relaying node". The relaying node may support one or multiple relayed UEs. The relaying node may also act as an access point or cluster header for the relayed UEs to access a radio network. A cluster head may be a UE, or it may be a type of device which has different capabilities from UE.

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: generate or receive a message comprising relay capability information, and transmit or forward the message to a device to device group.

According to a second aspect of the present invention, a method comprising: generating, by a relaying node or a node on behalf the relaying node, a message comprising relay capability information, or receiving, at a node, a message comprising relay capability information; and transmitting or forwarding the message to a device to device group.

According to a third aspect of the present invention, a computer program product comprising a non-transitory computer-readable medium bearing computer program code embodied therein for use with a computer, the computer program code comprising: code for generating or receiving a message comprising relay capability information, and code for transmitting or forwarding the message to a device to device group.

According to a fourth aspect of the present invention, an apparatus comprising: at least one processor; and at least one memory including computer program code, wherein the at least one memory and the computer program code are configured to, with the at least one processor, cause the apparatus to perform at least the following: select a relaying node, by a network node, from a group of user equipment with relay capability and within coverage of the network node based on at least one of: link quality with the network node, user equipment battery status, user equipment types, user equipment transmit power, mobility state, UE load status for relaying, volunteer status; receiving data from the relaying node; and sending acknowledgement to the relaying node if the data from the relaying node is received correctly.

According to a fifth aspect of the present invention, an apparatus comprising: means for generating or receiving a message comprising relay capability information, and means for transmitting or forwarding the message to a device to device group.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The subject matter disclosed herein provides a way for supporting UE to network relay with D2D communication. Specifically, there is provided a way of selecting a relaying node within a D2D group, a D2D group includes a group of inter-connected devices. There is also provided a way of transmitting relay capability information to the D2D group, a way of identifying packets for local D2D communication or to be relayed to radio network and a way of maintaining continuous service for the relayed UE when the relaying node is not available anymore because of reasons such as moving out of the coverage area of the network or the D2D group.

Figure 1:
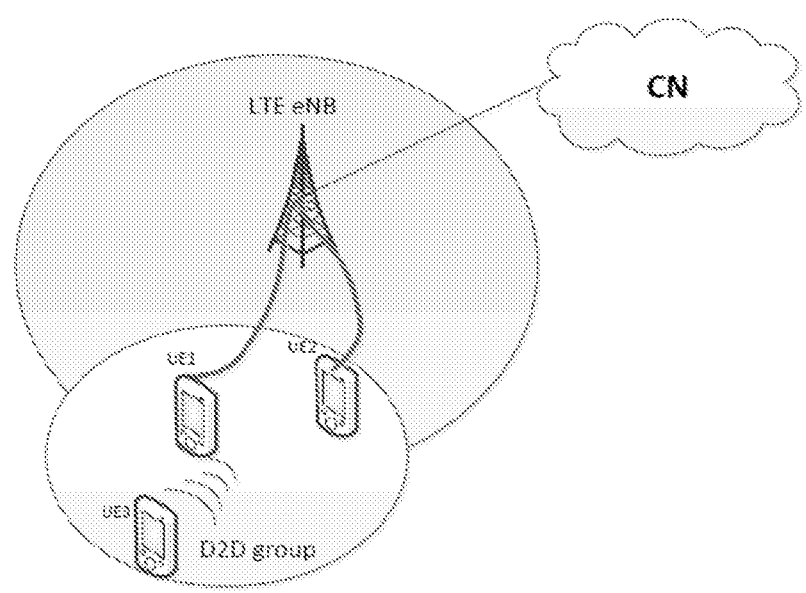
FIG. 1 depicts an example of a D2D communication with mobile relaying to a radio network in which some embodiments of the present invention may be practiced.

FIG. 1 depicts an example of a D2D communication with mobile relaying to a radio network in which some embodiments of the present invention may be practiced. As illustrated in FIG. 1, UE1, UE2 and UE3 are forming a D2D communication group. The relaying node, UE1 and/or UE2, are under control of a radio access node, for example an eNB in a Long Term Evolution (LTE) communication network, and are connected to core network (CN) through the eNB. The relaying node may set up a D2D radio link with the relayed UE, UE3. The relayed UE may not be able to set up a direct connection with the eNB. In order to utilize services provided through the eNB, the relayed UE may have an indirect connection with the eNB via the relaying node. Thus the relayed UE can communicate with the eNB. The D2D radio link may be cellular based, such as LTE based, or non-cellular based, such as WiFi based.

Although FIG. 1 depicts a certain quantity of user equipment, base stations, and cells, other quantities and configurations may be used as well. It is noted that the term of "relaying" is and will be hereinafter described for purposes of example. For example, the relaying may include the function of relaying, data forwarding, routing, bridging, and/or the likes.

Figure 2:
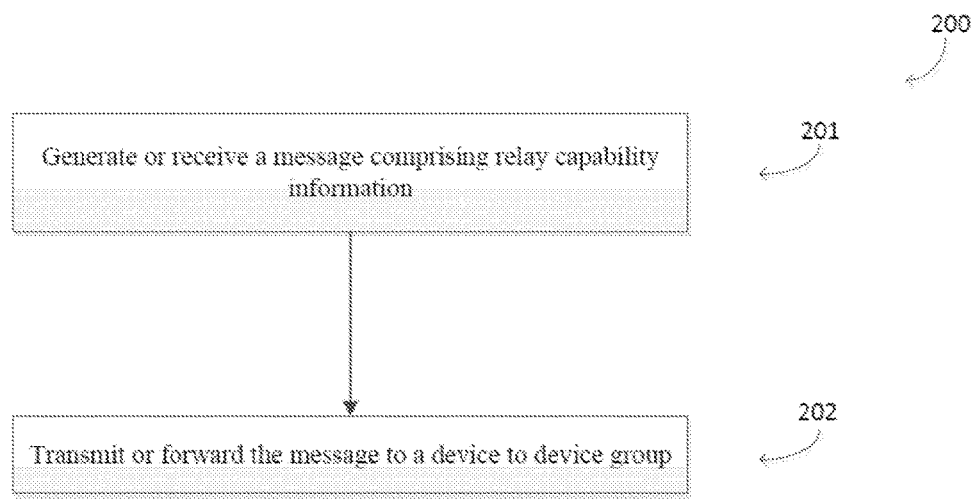
FIG. 2 depicts an example process for mobile relaying in accordance with some embodiments of the invention.

FIG. 2 is a flow chart illustrating an example method for mobile relaying in accordance with an example embodiment of the invention. Example method 200 may be performed by or in an apparatus, such as UE1 and UE2 of FIG. 1, and the apparatus 10 of FIG. 6.

At 201, a message comprising relay capability information is generated or received. In an example embodiment, the message comprising relay capability information is generated by the apparatus which is a relaying node. The relay node performs the function of relaying between a relayed UE such as UE3 of FIG. 1, and a network node, such as eNB of FIG. 1. The relay function may be active in the relaying node. The relay function may be present but inactive in the relaying node and may be activated to perform the relaying function. In another example embodiment, the message comprising relay capability information is generated by the apparatus which is a node on behalf of a relaying node. The relaying node still performs the function of relaying between a relayed UE and a network node. In a further example embodiment, the message comprising relay capability information is received by the apparatus which is a node in multi-hop connection and the message may be forwarded further by the apparatus.

The relay capability information comprises information indicating the apparatus's capability to relay data between a relayed UE within the D2D group, such as UE3 of FIG. 1, and a network node, such as the eNB of FIG. 1. In an example embodiment, the relay capability information is carried with one-bit indicating whether or not there is the apparatus which is capable of relay data between a relayed user within the D2D group and a network node.

At 202, the apparatus transmits the message to a D2D group if the message is generated by the apparatus or forwards the message to a D2D group if the message is received at the apparatus.

Figure 3:
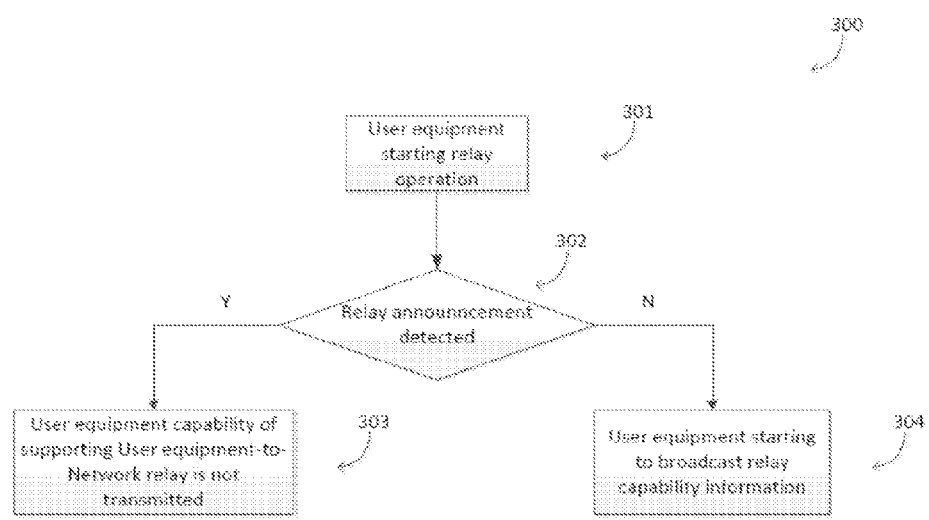
FIG. 3 depicts an example process for transmitting relay capability information in accordance with some embodiments of the invention.

In some example embodiments, the apparatus is a cluster head. The relay capability information is transmitted by the cluster head to the D2D group on behalf of some group members. In some other example embodiments, the apparatus is not assigned as a cluster head. FIG. 3 is a flow chart illustrating an example method for transmitting relay capability information when the apparatus is not assigned as a cluster head. There may be multiple of UEs within the D2D group which can perform the function of relaying. As shown in FIG. 3, at 302, a UE with relay capability may detect whether there is at least another UE in the same D2D group which has announced the relay capability information to the D2D group. If the detection is positive, at 303, the UE does not transmit relay capability information to the D2D group. If the detection is negative, at 304, the UE starts transmitting the relay capability information to the D2D group.

In some example embodiments, a UE which needs help for relaying, such as UE3 of FIG. 1, may announce the help to the D2D group by sending a relaying request. The relaying request may be sent by explicit message transmitted to the whole group, or it may be sent on a channel specified for sending relaying request. In some example embodiments, the relaying request is sent before the apparatus transmits relay capability information. In some other example embodiments, the relaying request is sent after the apparatus transmitted relay capability information. The signaling overhead for transmitting relay capability information may be less with the former example embodiments because there may be no UE needs relay help and therefore the transmitting relay capability information is pure overhead. On the other hand, the link establishment latency may be less with the latter example embodiments because UE3 does not need to wait for the relay capability information to be transmitted since it already knows which UE may perform relaying.

The apparatus relays both uplink data transmitted from the relayed UE and towards the network node, as well as downlink data transmitted from the network node and towards the relayed UE.

Figure 4:
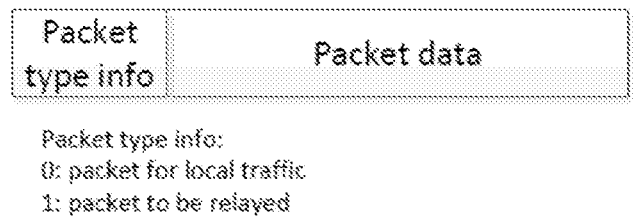
FIG. 4 depicts an example format for packet data header in accordance with some embodiments of the invention.

For uplink data packet transmitted from the relayed UE, the apparatus identifies whether the data packet is transmitted towards the D2D group or to be relayed towards the network node. In an example embodiment, the apparatus differentiates data packet based on packet header. FIG. 4 depicts an example format for packet data header in accordance with some embodiments of the invention. As shown in FIG. 4, a one-bit packet type information field is added to the packet data header to indicate whether the data packet is targeted towards the local D2D group or to be relayed towards the network node. The information may be carried on different layers. For example, the information may be piggybacked with lower layer data, such as MAC layer header or physical layer header like demodulation reference signal (DMRS) or implicitly carried by the logical channel ID. The information may also be included in higher layer header, which may require additional processing at the apparatus. In another example embodiment, the apparatus differentiates data packet based on dedicated channel. For example, different resources, such as different time and/or frequency domain resource, are used for transmission of local D2D packets and packets to be relayed to network. In yet another example embodiment, the apparatus differentiates data packet based on preamble. Different preambles may be used to differentiate the destination of the data packets. For example, a total number of N preamble sequences are specified in which a subset of M sequences is allocated for relay traffic towards the network node and the rest of N-M sequences is allocated for local D2D traffic. The preamble sequence may be used for indication purpose only, for example, after the apparatus received the data packet, it may remove the preamble before relaying the packet to the network. Furthermore, different sequences within the M sequences may be used to separate packets from different relaying nodes.

For downlink data packet transmitted from the network node, the apparatus needs to identify whether the destination of the data packet is itself or the relayed UE. In an example embodiment, the apparatus differentiates data packet based on internet protocol (IP) address. Different IP addresses are allocated to packets destined to the apparatus and the relayed UE. In another example embodiment, the apparatus differentiates data packet based on packet header. For example, a one-bit packet type information field is added to the packet header to indicate whether the destination of the data packet is the apparatus or the related UE. The packet type information may be transparent to the network node. In this case the network node is not informed of the packet type information, instead it forwards the received information to the apparatus. The packet type information may also be non-transparent to the network node. In this case the network node is informed of the packet type information. The network node may include the information in lower layer protocol, such as MAC layer header or physical layer header. In a further example embodiment, the apparatus may differentiate data packet based on logical channel allocation. Different logical channels may be allocated to packets destined to the relayed UE and the apparatus. For example, logical channel #1 is allocated to packets destined to the relayed UE, and logical channel #2 is allocated to packets destined to the apparatus. After the apparatus identified that the destination of the packet is a relayed UE, it relays the packet to the relayed UE.

Due to the nature of mobile communication, the relaying node may move out of the coverage of the D2D group or out of coverage of the network. In order to maintain service continuity of the relayed UE, another relaying node will take over the task of relaying for the relayed UE. In some example embodiments, the network node may appoint a candidate relaying node for the relayed UE. In case the current relaying node moves out, the candidate relaying node continues without a noticeable break for the relayed UE. In some scenarios, there may be more than one relaying nodes relay the same packet and the network node drops duplicated packets if duplicated packets are received from multiple relaying nodes. In some other example embodiments, the relaying node notifies cluster head or other UEs within the same D2D group about its mobility status. Based on the mobility status, for example, the relaying UE is about to move out or is not available for relaying, other UEs may take over the task of relaying for the relayed UE.

Figure 5:
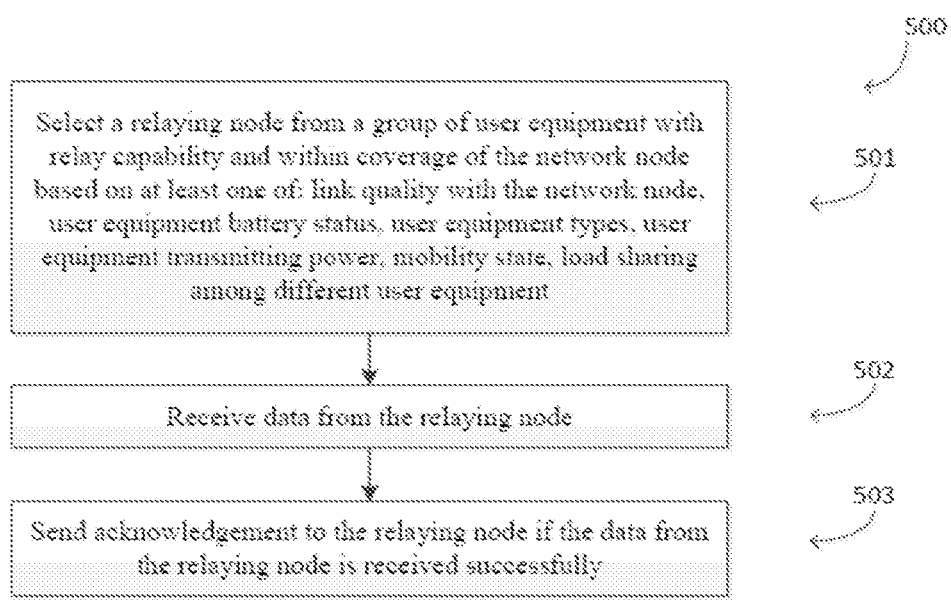
FIG. 5 depicts an example process for network operation in accordance with some embodiments of the invention.

Within a D2D group, simultaneously there may be multiple UEs with relay capability and within the coverage of the network node. For example, in FIG. 1, both UE1 and UE2 are within the coverage of the eNB and can perform the function of relaying for UE3. The network node may need to select which UE will relay data for UE3. FIG. 5 is flow chart illustrating an example method for network operation in accordance with some embodiments of the invention. Example method 500 may be performed by or in an apparatus, such as the base station of FIG. 7.

At 501, the apparatus selects a relaying node from a group of UE with relay capability and within coverage of the apparatus. The selection may be based on at least one of the following criteria. The selection of a relaying node may also be performed by a member within a D2D group, such as cluster head or UEs sharing information within the group. The first criteria is link quality of the UE with the apparatus, such as reference signal receive power (RSRP). For example, the apparatus may select the UE with the best link quality as the relaying node so that data packets are more likely to be received correctly. The second criteria is UE battery status. For example, UE with more battery time left may be selected so that it has less performance impact on its own ongoing services and it is also more likely to complete the relaying session for the relayed UE. The third criteria is UE type. For example, a vehicle type, such as police car or ambulance, may have higher priority than normal hand-held UE. The fourth criteria is UE transmit power. For example, the apparatus may select a UE with highest transmit power as the relaying node so that data packets are more likely to be transmitted successfully. The fifth criteria is UE mobility state. For example, the apparatus may select a UE with least possibility to move as the relaying node so that there are less channel variations and the relaying node is less likely to move out of the coverage area of the apparatus. The sixth criteria is UE load status for relaying. For example, some UEs are already performing relaying for one or more relayed UEs. The apparatus may select a UE with the least loaded as the relaying node to avoid overloading the other UEs.

At 502, the apparatus receives data from the relaying node.

At 503, the apparatus sends acknowledgement to the relaying node if the data from the relaying node is received correctly. In case there is more than one relaying node relayed the same message to the apparatus, the apparatus will drop the duplicated packets.

When the apparatus transmits data to the relaying node, the apparatus may differentiate whether the destination of the data packet is the relaying node or the relayed UE. In an example embodiment, the apparatus differentiates data packet based on internet protocol (IP) address. Different IP addresses are allocated to packets destined to the relaying node and the relayed UE. In another example embodiment, the apparatus differentiates data packet based on packet header. For example, a one-bit packet type information field is added to the packet header to indicate whether the destination of the data packet is the relaying node or the relayed UE. In a further example embodiment, the apparatus differentiates data packet based on logical channel allocation. Different logical channels may be allocated to packets destined to the relaying node and the relayed UE. For example, logical channel #1 is allocated to packets destined to the relayed UE, and logical channel #2 is allocated to packets destined to the relaying node. The apparatus transmits the data packet to the relaying node based on the differentiation.

Figure 6:
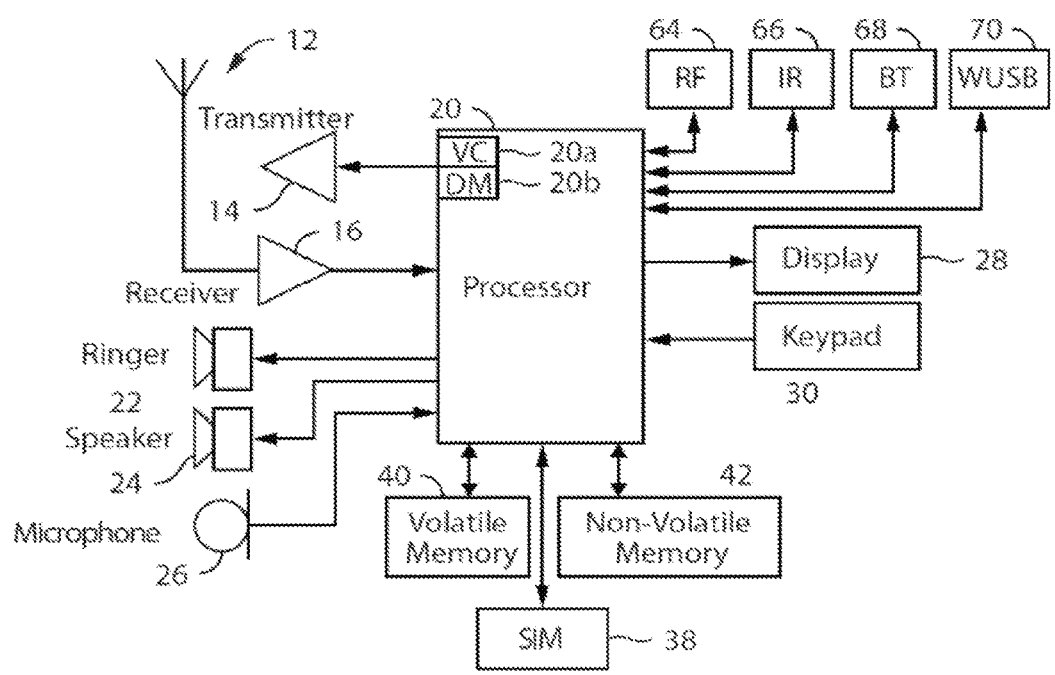
FIG. 6 illustrates a block diagram of a user equipment in accordance with some embodiments of the invention.

FIG. 6 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 6 as a single processor, in some embodiments the processor 20 comprises a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus 10 may comprise a battery for powering various circuits related to the apparatus, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 6, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™' BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise a non-transitory memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment. The memories may comprise an identifier, such as for example, an international mobile equipment identification (IMEI) code, capable of uniquely identifying apparatus 10.

Figure 7:
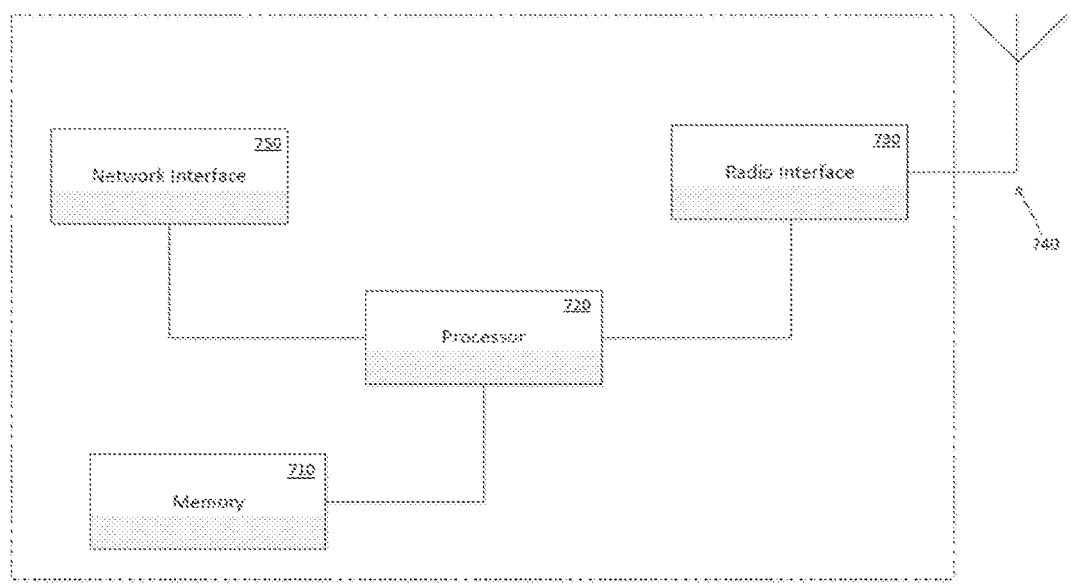
FIG. 7 illustrates a block diagram of a base station in accordance with some embodiments of the invention.

FIG. 7 depicts an example implementation of a base station in accordance with some embodiments of the invention, such as eNB of FIG. 1. The base station 70 may include one or more antennas 740 configured to transmit via a downlink and configured to receive uplinks via the antenna(s). The base station may further include a plurality of radio interfaces 730 coupled to the antenna 740. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 730 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). The base station may further include one or more network interfaces 750, for receiving and transmitting to other base stations and/or core networks. The base station may further include one or more processors, such as processor 720, for controlling the interfaces 730 and 750 and for accessing and executing program code stored in memory 710. In some example embodiments, the memory 710 includes code, which when executed by at least one processor causes one or more of the operations described herein with respect to a base station.

Without in any way limiting the scope, interpretation, or application of the claims appearing below, a technical effect of one or more of the example embodiments disclosed herein may include enabling user equipment to network relaying based on D2D relay capability information.

Embodiments of the present invention may be implemented in software, hardware, application logic or a combination of software, hardware and application logic. The software, application logic and/or hardware may reside on a non-transitory memory 40 and/or 42, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable non-transitory storage medium that may be any media or means that can contain or store the instructions for use by or in connection with an instruction execution system, apparatus, or device, such as a computer. The scope of the present invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Other embodiments may be within the scope of the following claims. The term "based on" includes "based at least in part on".

What is claimed is:

1. A method comprising:
generating, by a relaying node or a node on behalf the relaying node, a message comprising relay capability information;
transmitting or forwarding the message to a device to device group; and
in response to receiving uplink packet transmitted from a relayed user equipment in the device to device group, differentiating whether the uplink packet is local device to device traffic or relay traffic to a base station by at least one of: packet header, dedicated channel and preamble; wherein with packet header, a packet type information field is included into packet header to indicate the packet is for local device to device traffic or to be relayed to a base station, wherein with dedicated channel, different physical resources are used for local device to device traffic and relay traffic to the base station, and wherein with preamble, a subset of preamble sequences is allocated for relay traffic to the base station and the rest of preamble sequences is allocated for local device to device traffic.

2. The method according to claim 1, wherein the message is generated and transmitted by the relaying node, and wherein relay function is active in the relaying node, the method further comprising: relaying data between the base station and the relayed user equipment by the relaying node.

3. The method according to claim 1, wherein the message is generated and transmitted by the relaying node, and wherein relay function is present but not activated in the relaying node, the method further comprising: activating relay function in the relaying node; and relaying data between the base station and the relayed user equipment by the relaying node.

4. The method according to claim 1, further comprising: receiving relaying request from the relayed user equipment.

5. The method according to claim 4, wherein the relaying request is received on a broadcast message or a channel specified for sending relaying request.

6. The method according to claim 1, wherein the relaying node is a cluster head and wherein the relay capability information is transmitted by the cluster head to the device to device group.

7. The method according to claim 1, wherein the relaying node is not a cluster head and the method further comprising:
detecting whether relay capability information has been announced by other user equipment within the device to device group.

8. The method according to claim 1, further comprising: differentiating downlink packet destined to the relayed user equipment or the relaying node by at least one of: internet protocol address, packet header, logical channel, wherein with internet protocol address, different internet protocol addresses are allocated to packets destined to the relayed user equipment and the relaying node, wherein with packet header, a packet type information field is included in packet header to indicate whether the packet is destined to the relayed user equipment or the relaying node, and wherein with logical channel, different logical channels are allocated to packets destined to the relayed user equipment and the relaying node.

9. The method according to claim 1, further comprising: notifying mobility status to a cluster head or a user equipment within the device to device group.

10. An apparatus, comprising:
at least one processor; and
at least one memory including computer program code, wherein the at least one memory and the computer program code are configured to, with the at least one processor, cause the apparatus to:
generating a message comprising relay capability information;
transmitting or forwarding the message to a device to device group; and
in response to receiving uplink packet transmitted from a relayed user equipment in the device to device group, differentiating whether the uplink packet is local device to device traffic or relay traffic to a base station by at least one of: packet header, dedicated channel and preamble; wherein with packet header, a packet type information field is included into packet header to indicate the packet is for local device to device traffic or to be relayed to a base station, wherein with dedicated channel, different physical resources are used for local device to device traffic and relay traffic to the base station, and wherein with preamble, a subset of preamble sequences is allocated for relay traffic to the base station and the rest of preamble sequences is allocated for local device to device traffic.

11. The apparatus according to claim 10, wherein the apparatus comprises at least one of a relaying node, a node on behalf a relaying node, and a node which is capable of forwarding the message to the device to device group.

12. The apparatus according to claim 10, wherein the apparatus is further caused to:
receive a relaying request from the relayed user equipment.

13. The apparatus according to claim 12, wherein the relaying request is received on a broadcast message or a channel specified for sending relaying request.

14. The apparatus according to claim 10, wherein the apparatus is a cluster head and wherein the relay capability information is transmitted by the apparatus to the device to device group.

15. The apparatus according to claim 10, wherein the apparatus is not a cluster head and the apparatus is further caused to: detect whether relay capability information has been announced by other user equipment within the device to device group.

16. The apparatus according to claim 10, wherein the apparatus is further caused to differentiate downlink packet destined to a relayed user equipment or the apparatus by at least one of: internet protocol address, packet header, logical channel, wherein with internet protocol address, different internet protocol addresses are allocated to packets destined to the relayed user equipment and the apparatus, wherein with packet header, a packet type information field is included in packet header to indicate whether the packet is destined to the relayed user equipment or the apparatus, and wherein with logical channel, different logical channels are allocated to packets destined to the relayed user equipment and the apparatus.

17. The apparatus according to claim 10, wherein the apparatus is further caused to notify mobility status to a cluster head or a user equipment within the device to device group.

18. An apparatus, comprising:
at least one processor; and
at least one memory including computer program code, wherein the at least one memory and the computer program code are configured to, with the at least one processor, cause the apparatus to:
select a relaying node from a group of user equipments with relay capability and within coverage of the apparatus based on at least one of: link quality with the user equipments, user equipment battery status, user equipment types, user equipment transmit power, mobility state, UE load status for relaying, volunteer status;
receiving data from the relaying node; and
sending acknowledgement to the relaying node if the data from the relaying node is received correctly.

* * * * *